(12) United States Patent
Misiaszek et al.

(10) Patent No.: US 11,862,165 B1
(45) Date of Patent: Jan. 2, 2024

(54) OPTIMIZED VIRTUAL ASSISTANT FOR CONNECTING A USER TO A LIVE AGENT

(71) Applicant: Truist Bank, Charlotte, NC (US)

(72) Inventors: Alex Heath Misiaszek, Cornelius, NC (US); Mary Kim Clouser, Summerville, SC (US); William Christopher Hawks, Charlotte, NC (US); Kimberly C. Steudtner, Louisville, KY (US); Kyla Smith, Moss, TN (US); Christopher Alexander Tase, Sparta, TN (US); Yadhira Haydee Arroyo, Chicago, IL (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 17/898,784

(22) Filed: Aug. 30, 2022

(51) Int. Cl.
*G06F 3/0484* (2022.01)
*G06F 40/35* (2020.01)
(Continued)

(52) U.S. Cl.
CPC ............ *G10L 15/22* (2013.01); *G06F 3/0482* (2013.01); *G06F 3/0484* (2013.01);
(Continued)

(58) Field of Classification Search
CPC ... G10L 15/22; G10L 15/063; G10L 15/1815; G06F 3/0482; G06F 3/0484; G06F 40/279; G06F 40/35; G06F 2203/04803
See application file for complete search history.

(56) References Cited

U.S. PATENT DOCUMENTS

| | | | | |
|---|---|---|---|---|
| 9,471,638 | B2 * | 10/2016 | Roytman | G06F 16/9535 |
| 9,559,993 | B2 * | 1/2017 | Palakovich | H04L 51/02 |

(Continued)

FOREIGN PATENT DOCUMENTS

| | | | | |
|---|---|---|---|---|
| CN | 107786430 B | * | 10/2020 | H04L 51/02 |
| WO | WO2002009399 A2 | * | 1/2002 | H04M 3/51 |
| WO | WO-2021205240 A1 | * | 10/2021 | H04L 51/04 |

OTHER PUBLICATIONS

Using Settimeout to warn and finally redirect user for inactive session not working, retrieved from—https://stackoverflow.com/questions/58874818/using-settimeout-to-warn-and-finally-redirect-user-for-inactive-session-not-work, Nov. 15, 2019, 5 pages (Year: 2019).*

(Continued)

*Primary Examiner* — Yongjia Pan
(74) *Attorney, Agent, or Firm* — Kilpatrick Townsend & Stockton LLP; Michael A. Springs, Esq.

(57) ABSTRACT

A system is provided that can provide a virtual assistant that can receive inputs from a user and can provide responses to the user. The system can perform natural language processing on the inputs to process the inputs into inputs that are comprehendible by the virtual assistant. The system can predict, based on the inputs, at least one objective of the user. The at least one objective can include a first objective for communication with a live agent and the at least one objective can include a second objective for a purpose for the communication with the live agent. Additionally, the system can determine the live agent that can be best suited to assist the user based on the second objective. The system can connect the user and the live agent. The virtual assistant can facilitate the connection by providing information to the user and to the live agent.

17 Claims, 4 Drawing Sheets

(51) Int. Cl.
  *G10L 15/22* (2006.01)
  *G06F 40/279* (2020.01)
  *G10L 15/06* (2013.01)
  *G10L 15/18* (2013.01)
  *G06F 3/0482* (2013.01)

(52) U.S. Cl.
  CPC ............ *G06F 40/279* (2020.01); *G06F 40/35* (2020.01); *G10L 15/063* (2013.01); *G10L 15/1815* (2013.01); *G06F 2203/04803* (2013.01)

(56) References Cited

U.S. PATENT DOCUMENTS

| | | | | |
|---|---|---|---|---|
| 9,647,968 | B2* | 5/2017 | Smullen | H04L 67/02 |
| 9,912,810 | B2* | 3/2018 | Segre | H04L 51/046 |
| 10,003,692 | B2* | 6/2018 | Skiba | H04M 3/5141 |
| 10,171,662 | B1* | 1/2019 | Zhou | G10L 25/63 |
| 10,601,740 | B1* | 3/2020 | Harding | H04L 51/04 |
| 10,992,718 | B2* | 4/2021 | Baer | H04L 65/1069 |
| 10,999,434 | B1* | 5/2021 | Andar | G06N 5/04 |
| 11,190,469 | B2* | 11/2021 | Erhart | G06F 40/30 |
| 11,477,142 | B1* | 10/2022 | Lewis | H04L 51/02 |
| 2013/0346886 | A1* | 12/2013 | Cauchois | H04L 51/046 |
| | | | | 715/758 |
| 2016/0275582 | A1* | 9/2016 | Zuverink | G06F 3/04842 |
| 2016/0358240 | A1* | 12/2016 | Redfern | G06Q 30/0619 |
| 2016/0360039 | A1* | 12/2016 | Sanghavi | H04L 51/046 |
| 2018/0219807 | A1* | 8/2018 | Thinguldstad | H04L 51/02 |
| 2018/0239837 | A1* | 8/2018 | Wang | G06F 16/90335 |
| 2018/0359205 | A1* | 12/2018 | Karnati | G06F 9/451 |
| 2019/0052584 | A1* | 2/2019 | Barve | G06Q 10/04 |
| 2020/0219494 | A1* | 7/2020 | Dhoolia | G10L 15/16 |
| 2021/0081442 | A1* | 3/2021 | Ganu | G06N 5/02 |
| 2021/0136205 | A1* | 5/2021 | Adibi | G06N 20/00 |

OTHER PUBLICATIONS

Artificial Intelligence While You Wait, Mar. 11, 2020, 7 pages (Year: 2020).*

* cited by examiner

OPTIMIZED VIRTUAL ASSISTANT FOR CONNECTING A USER TO A LIVE AGENT

TECHNICAL FIELD

The present disclosure relates generally to managing automated communication systems and, more particularly (although not necessarily exclusively), to an optimized virtual assistant for connecting a user to a live agent.

BACKGROUND

Communications, such as in-person interactions, telephone conversations, or electronic message exchanges, between a customer service associate and a client can be inefficient. Digital assistants can be used to interact with clients in an automated fashion to improve efficiency. Digital assistants, though, may still be unable to completely assist clients for some requests or issues, such as issues involving confidential information, personnel assets, or other issues for which a live person is better equipped to address. Managing communications between automated systems and live person systems can be challenging.

SUMMARY

Communication with a live agent can be provided for a user via an optimized virtual assistant. For example, a system can include a processor and a memory that includes instructions executable by the processor device to perform operations. The operations can include providing a virtual assistant that can receive inputs from a user and can provide responses to the user. In some examples, an interaction between the virtual assistant and the user is displayed in a chat window on a multi-modal user interface and the multi-modal user interface can be accessed on a user device. Additionally, the multi-modal user interface can enable the virtual assistant to receive inputs by various modes of communication. The operations can further include performing natural language processing on the inputs to process the inputs into inputs that are comprehendible by the virtual assistant. In some examples, the natural language processing can include processing inputs received by at least two different modes of communication. The operations can also include predicting, based on the inputs, objectives of the user. For examples, an objective can be for communication with a live agent and a second objective can be for a purpose for the communication with the live agent. The operations can also include determining the live agent that can be best suited to assist the user based on the second objective. The operations can further include connecting the user and the live agent. The virtual assistant can facilitate the connection of the user and the live agent by providing information to the user and to the live agent. The operations can also include detecting the user interacting with the multi-modal user interface or detecting the user is not interacting with the multi-modal user interface.

In another example, a method can include providing a virtual assistant that can receive inputs from a user and can provide responses to the user. In some examples, an interaction between the virtual assistant and the user is displayed in a chat window on a multi-modal user interface and the multi-modal user interface can be accessed on a user device. Additionally, the multi-modal user interface can enable the virtual assistant to receive inputs by various modes of communication. The method can further include performing natural language processing on the inputs to process the inputs into inputs that are comprehendible by the virtual assistant. In some examples, the natural language processing can include processing inputs received by at least two different modes of communication. The method can also include predicting, based on the inputs, objectives of the user. For examples, an objective can be for communication with a live agent and a second objective can be for a purpose for the communication with the live agent. The method can also include determining the live agent that can be best suited to assist the user based on the second objective. The method can further include connecting the user and the live agent. The virtual assistant can facilitate the connection of the user and the live agent by providing information to the user and to the live agent. The method can also include detecting the user interacting with the multi-modal user interface or detecting the user is not interacting with the multi-modal user interface.

In an example, a non-transitory computer-readable medium includes instructions that are executable by a processor for causing the processor to perform operations. The operations can includes providing a virtual assistant that can receive inputs from a user and can provide responses to the user. In some examples, an interaction between the virtual assistant and the user is displayed in a chat window on a multi-modal user interface and the multi-modal user interface can be accessed on a user device. Additionally, the multi-modal user interface can enable the virtual assistant to receive inputs by various modes of communication. The operations can further include performing natural language processing on the inputs to process the inputs into inputs that are comprehendible by the virtual assistant. In some examples, the natural language processing can include processing inputs received by at least two different modes of communication. The operations can also include predicting, based on the inputs, objectives of the user. For examples, an objective can be for communication with a live agent and a second objective can be for a purpose for the communication with the live agent. The operations can also include determining the live agent that can be best suited to assist the user based on the second objective. The operations can further include connecting the user and the live agent. The virtual assistant can facilitate the connection of the user and the live agent by providing information to the user and to the live agent. The operations can also include detecting the user interacting with the multi-modal user interface or detecting the user is not interacting with the multi-modal user interface.

DETAILED DESCRIPTION

Figure 1:
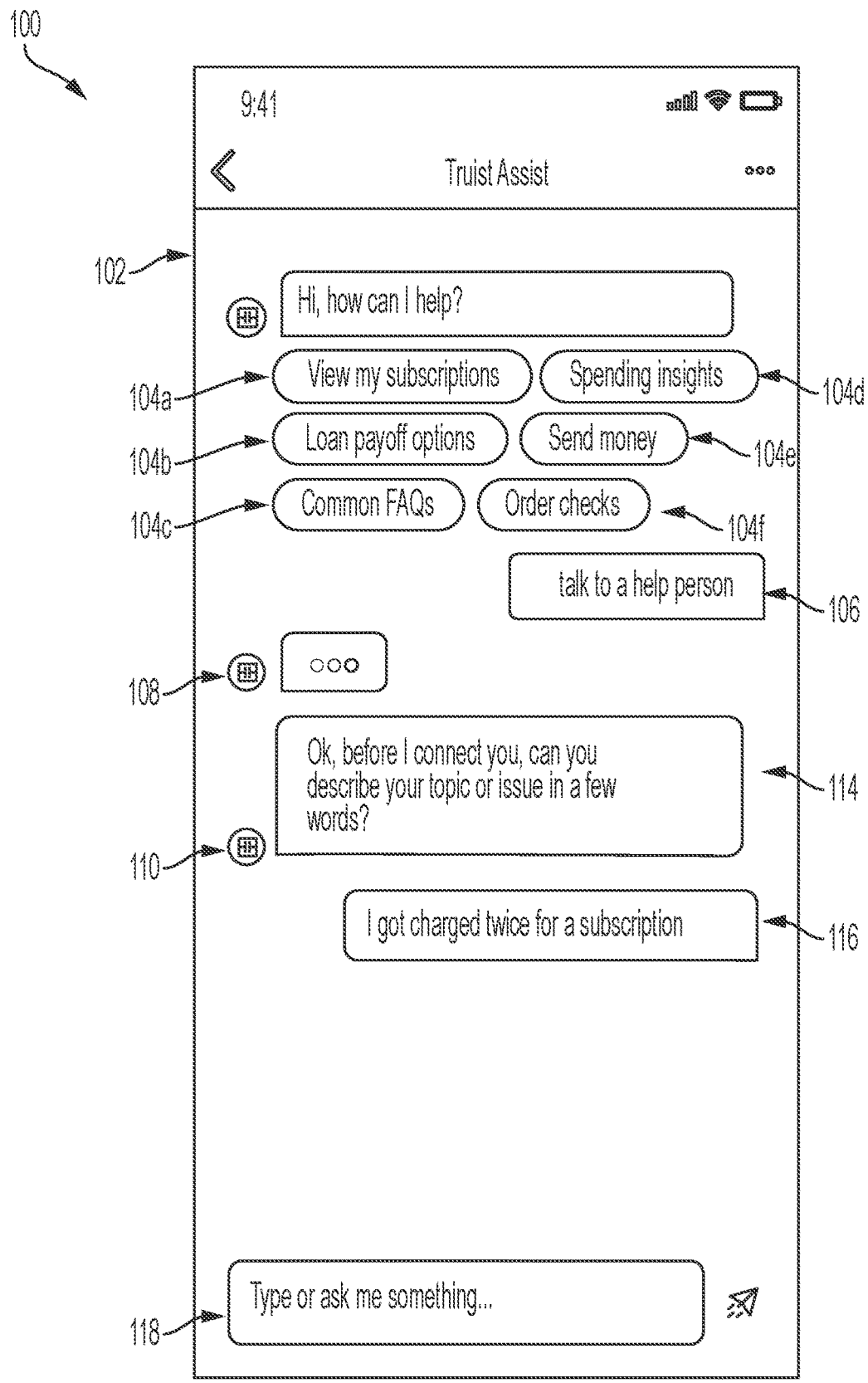
FIG. 1 is an example of a multi-modal user interface that can display output from a virtual assistant for connecting a user and a live agent according to one example of the present disclosure.

Certain aspects and examples of the present disclosure relate to optimizing a virtual assistant for connecting a user to a live agent. The virtual assistant can be a software or computer program that can simulate a human conversation. In some examples, the virtual assistant can interact with the user via spoken or written communication and the interaction can be displayed in a chat window on a multi-modal user interface. The multi-modal user interface can be accessed by the user on a user device. The user device may be a mobile phone, a smart phone, a tablet, a personal computer, etc. The multi-modal user interface can be a user interface that enables the user to interact with the virtual assistant using two or more different modes of communication. The multi-modal user interface can further process two or more user inputs provided by the two or more different modes of communication. Examples of different modes of communication for providing input can include the user providing the user input via text, touch, speech, manual gestures, or other suitable modes that can be processed by the multi-modal user interface.

Optimizing the virtual assistant can include performing natural language understanding, natural language processing, and the like on the user input. Natural language processing can be algorithms or other suitable tools or techniques for enabling the virtual assistant to recognize and understand the user input. Similarly, natural language understanding can be algorithms or other suitable tools and techniques for enabling the virtual assistant to understand the meaning of the user input. In some examples, utterance learning can be a tool for processing the user input. The utterance learning can include intents, which can be the various, broad categories in which the inquiries can fall into. Additionally, an utterance can be used in the utterance learning to learn, predict, or a combination thereof the various words, phrases, sentences, etc. that the user may provide in relation to the intents. Furthermore, entities can be the most relevant words, phrases, sentences, etc. in the utterance for determining the intent. The utterance learning can improve the virtual assistant's ability to understand the user input, process the user input, respond to the user input, or a combination thereof. The utterance learning can further improve the efficiency of connecting the user to the live agent.

Current systems can require excess processing time to determine the information desired by the user and thus require additional processing time to connect the user and the live agent. Additionally, current systems may exhibit memory management issues, in which the system cannot save chat history, user activity, etc. Therefore, the user may not be able to leave a chat window, application, website, phone call, or the like until the user is connected to the live agent. The use of a virtual assistant that can receive inputs from the user by various modes of communication and can process the various modes of communication can improve the efficiency of connecting the user and the live agent by decreasing the processing time for determining the information required by the user. Furthermore, performing utterance learning on the inputs from the user can decrease processing time by enabling the system to quickly comprehend and determine the information required by the user. Additionally, by detecting user activity and storing the interaction between the user and the virtual assistant memory management can be improved.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is an example of a multi-modal user interface 100 that can display output from a virtual assistant 110 for connecting a user and a live agent according to one example of the present disclosure. As illustrated, the user can provide an input 106 to the virtual assistant 110 via the multi-modal user interface 100. In some examples, the user can provide the input 106 via a chat box 118 in a chat window 102. The virtual assistant 110 can provide a response 114 to the input 106. The response 114 can be a response 114 requesting additional information from the user for accurately connecting the user and the live agent. The user can provide a second input 116 with the additional information.

Additionally or alternatively, the user can provide the input 106 or the second input 116 by additional modes of communication such as speech or the user can press or otherwise select options 104a-f. The options 104a-f can help the virtual assistant 110 determine the live agent best suited to assist the user, connect the user to resources, automatically connect the user and the live agent, or provide other suitable functions related to assisting the user. For example, the options 104a-f can be related to banking operations. Examples of banking operations can include issuing loans, client service, investment analysis, risk analysis and mitigation, technical operations, or any other suitable operation related to a banking environment. As illustrated, the options 104a-f can include options related to subscriptions 104a, spending 104d, frequently asked questions 104c, loans 104, or other suitable banking operations or the options can be actions such as sending money 104e, ordering checks 104f, etc.

The chat window 102 can further include at least one visual indicator 108. As illustrated, the at least one visual indicator 108 can show the user that the virtual assistant 110 is responding. The chat window 102 may include additional visual indicators, for example, to show that the virtual assistant 110 is processing a query or determining the relevant live agent. Additionally, the user may interact with the at least one visual indicator 108. For example, the user may be able to cancel an input or an interaction with the virtual assistant 110 or the live agent, or the user may be able to undo an input 106 to the virtual assistant 110 via the at least one visual indicator 108. Undoing or canceling input 106 to the virtual assistant 110 can decrease processing time and decrease wasted resources. For example, an input to the virtual assistant can be misinterpreted by the system. Therefore, rather than requiring additional inputs from the user to fix the misinterpreted input, the user can start over or go back and try again with a new input for the virtual assistant 110. Thus, the at least one visual indicator 108 can improve the efficiency of the interaction between the virtual assistant 110 and the user for connecting the user and the live agent.

Figure 2:
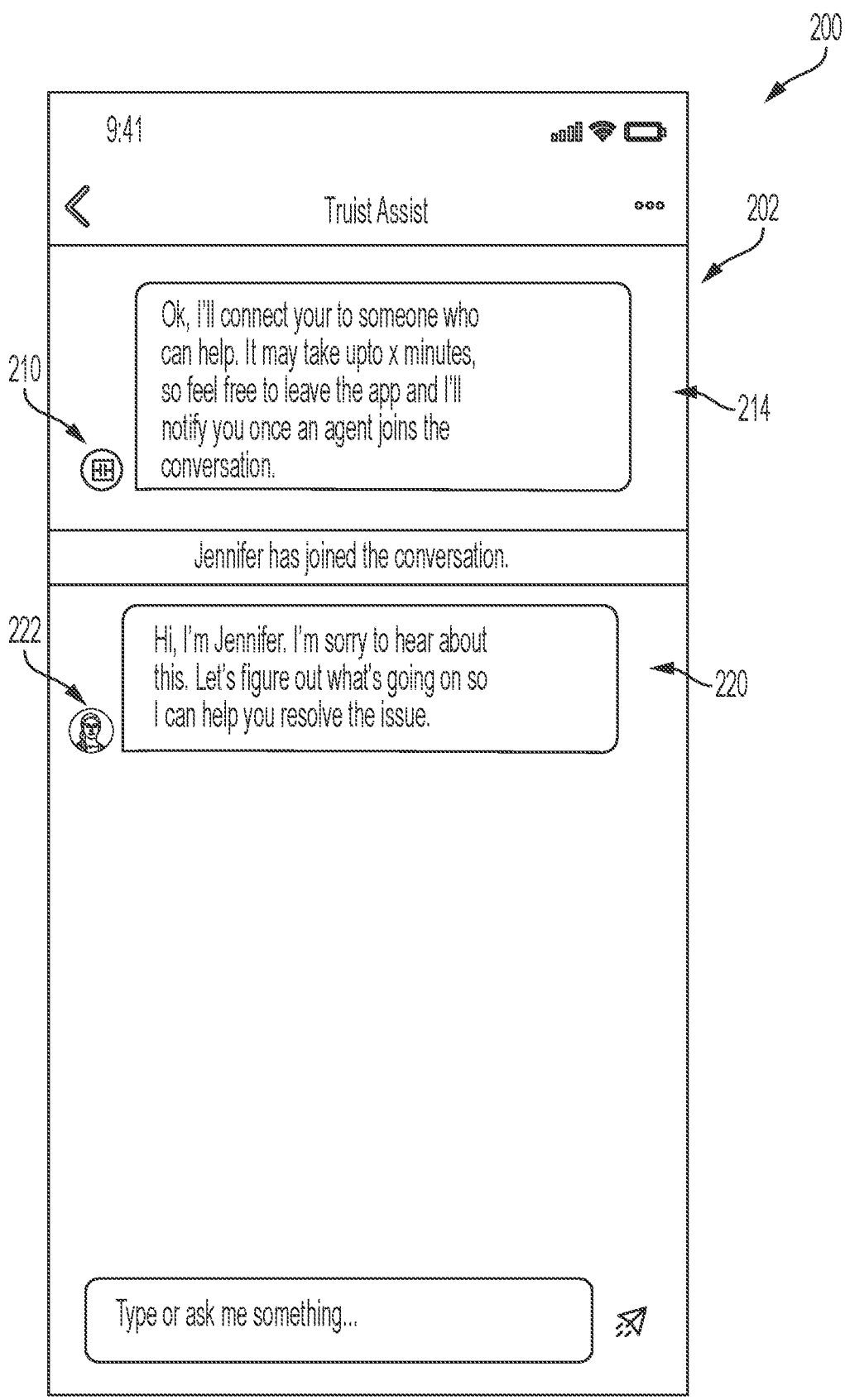
FIG. 2 is an example of a multi-modal user interface that can display output from a virtual assistant for connecting a user and a live agent according to one example of the present disclosure.

FIG. 2 is an example of a multi-modal user interface 200 that can display output from a virtual assistant 210 for connecting a user and a live agent 222 according to one example of the present disclosure. As illustrated, the virtual assistant 210 can provide a response 214 in chat window 202, which can include a statement with information for the user. The response 214 can notify the user that the user can leave the chat, can notify the user that the user is being connected to the live agent 222, and can provide an amount of time for connecting the user to the live agent 222. The response 214 may further include additional information such as information related to an input, the live agent 222, or additional information related to client services.

The virtual assistant 210 can connect the user to the live agent 222 via the chat window 202. The live agent 222 can provide a response 220 to the user related to the input. Additionally or alternatively, the live agent 222 may connect with the user via email, phone, or other suitable communication method. The user can communicate the preferred communication method to the virtual assistant 210, and the virtual assistant 210 can automatically connect the user and live agent 222 via the preferred communication method or provide information about the preferred communication method to the live agent 222. In some examples, the live agent 222 is related to banking operations. For example, the live agent 222 can be a banker, bank teller, loan processor, mortgage consultant, loan officer, internal auditor, or other suitable live agent related to banking operations.

Figure 3:
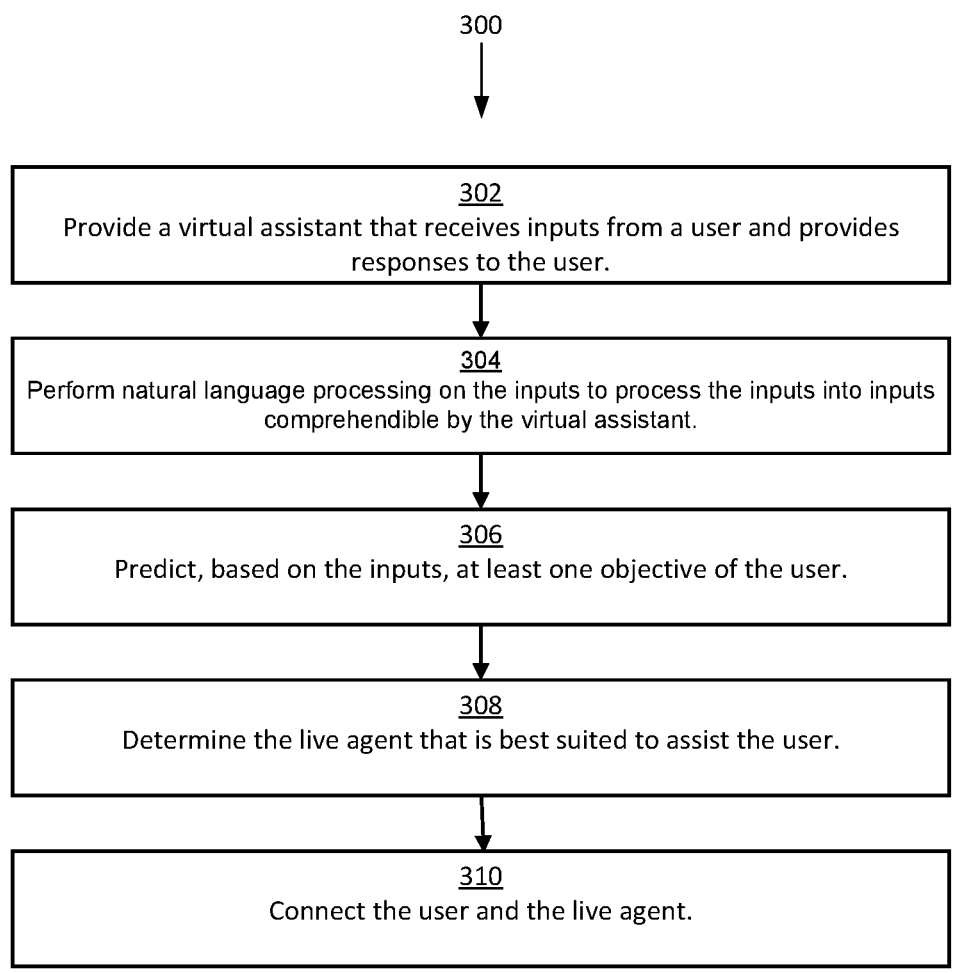
FIG. 3 is a flowchart of a process for connecting a user to a live agent via a virtual assistant according to one example of the present disclosure.

FIG. 3 is a flowchart of a process 300 for connecting a user to a live agent 222 via a virtual assistant 110 according to one example of the present disclosure. The process 300 can connect the user to the live agent 222 efficiently by quickly recognizing, processing, and understanding an input 106 from the user. The process 300 can further include quickly determining the live agent 222 that can satisfy inputs 106 from the user.

At block 302, the process 300 can involve providing a virtual assistant 110 that can receive inputs from a user and provide responses to the user. The virtual assistant 110 can be a software or computer program integrated with the multi-modal user interface 100 for simulating human interaction. The virtual assistant 110 can simulate human interaction by communicating to the user via text, speech, or a combination thereof. The interaction between the virtual assistant 110 and the user can be displayed in a chat window 102 on a multi-modal user interface 100. The multi-modal user interface 100 can be accessed and used by the user via a user device. In some examples, the user device can be a tablet, smart phone, laptop, etc. The multi-modal user interface can allow a user to provide the inputs by various modes of communication. For example, the modes of communication can include text in a chat window 102, tapping a button or other suitable display displayed on the multi-modal user interface 100, speech, other suitable modes of communication, or a combination thereof. The modes of communication can be processed by the multi-modal user interface 100, further processed the system performing natural language processing, and can be received by the virtual assistant 110. In some examples, the user can provide the inputs in more than one mode of communication substantially simultaneously.

Additionally, or alternatively process 300, can include providing the user at least one option 104a-f via the multi-modal user interface 100. The at least one option 104a-f can be provided to the user via the chat window 102 prior to receiving the inputs, while the virtual assistant 110 is interacting with the user, while the virtual assistant 110 is connecting the user and the live agent 222, while the user is interacting with the live agent 222, or a combination thereof. The at least one option 104a-f can be provided on the multi-modal user interface 100a-b as a display for the user to tap or otherwise select. The virtual assistant 110 can receive an input from the user corresponding the option the user selects. In some examples, the at least one option 104a-f can automatically connect the user and the live agent 222. For example, a security or fraud option can connect the user to a live agent 222 that can handle suspicious transactions or other suspicious acitivities. Additional examples of the at least one option 104a-f can include options regarding loans, subscriptions, credit card information, transactions, frequently asked questions, etc. Additionally, the at least one option may include an option to send money, order checks, or other suitable actions.

At block 304, the process 300 can involve performing natural language processing on the inputs to process the inputs into a result comprehendible by the virtual assistant 110. Natural language processing can be a machine learning model or other suitable tool or technique for transforming the inputs 106 into inputs that the virtual assistant 110 can understand. The natural language processing can further include processing inputs received by at least two different modes of communication. For example, natural language processing can be performed on speech from the user and text from the user. The natural language processing can be performed on different modes of communication in the order received or substantially simultaneously. In additional examples, a mode of communication, such as text, can be prioritized in the natural language processing. Then, the result of the natural language processing on the prioritized mode of communication can be used to improve the natural language processing of subsequent inputs in the same or alternative modes of communication.

Additionally or alternatively, the process 300 can further include performing natural language understanding on the inputs. Natural language understanding can be a machine learning model or other suitable tool or technique for enabling the virtual assistant 110 to understand the meaning of the input 106. Natural language understanding can further assist with generating an input comprehendible by the virtual assistant 110 and can improve the efficiency of connecting the user and the live agent 222. For example, utterance learning can be a natural language understanding technique. The utterance learning can involve training a machine learning model with various utterances. The various utterances can be words, phrases, sentences, etc. that can be part of the inputs from the user. The various utterances can be classified into intents. In some examples, the inputs can include utterances related to banking operations. Therefore, the intents may include loans, accounts, investments, or other suitable intents related to banking operations. The utterance learning can further include entities, slots (e.g., keywords that are used to trigger a person best suited to assist the user), or the like, which can be learned from the utterances. The entities, slots, or the like can be words, phrases, sentences, and the like that can be derived from the utterances and can be the most important words, phrases, sentences, and the like for determining the intent. In some examples, utterance learning can be performed on more than one mode of communication substantially simultaneously to improve processing of the inputs.

At block 306, the process 300 can involve predicting, based on the inputs at least one objective of the user. The at least one objective can include a first objective, which can indicate to the virtual assistant 110 that the user requires communication with a live agent 222. The at least one objective can also include one or more additional objectives for the purpose of the communication with the live agent 222. The one or more additional objectives can be the intents, additional classifications, or other suitable categories of issues, questions, tasks, etc. or the one or more additional objective can be other suitable client service matters that the user may be contacting the virtual assistant 110 about. Thus, the one or more additional objectives can further be used to determine the live agent 222.

At block 308, the process can involve determining the live agent 222 that is best suited to assist the user. The live agent 222 best suited to assist the user can be determined based on the one or more additional objectives, which can be related to the purpose or intent of the user contacting the virtual assistant 110. In some examples, slotting is used as a technique for determining the live agent 222. The technique can include triggering, alerting, or otherwise communicating the live agent 222 best suited to assist the user based on keywords, slots, entities, or other suitable portions of the inputs from the user. The virtual assistant 110 can seamlessly determine and connect the user to the live agent using slotting or other suitable techniques. The live agent 222 can be an employee or other suitable live agent 222 that can engage with the user, answer questions, provide information, resolve issues, or otherwise assist the user.

In some examples, a company or other suitable entity may include various live agents, and therefore it can be necessary to determine the live agent 222 best suited to assist the user. For example, in a banking operation the various live agents may include bank tellers, bankers, loan processors, mortgage consultants, investment representatives, credit analysts, etc. The various live agents can have specific skills, knowledge, or the like that can enable a live agent of the various live agents to help the user with specific questions, tasks, etc. Human skill IDs can be used to associate the various live agents and the types of questions, tasks, etc. that the various live agents can assist users with. Thus, in some examples, human skill IDs can be used to identify the live agent best suited to assist the user. For example, the intents identified in the utterance learning can be further tagged, sorted, or otherwise classified based on the human skill IDs. The entities, slots, keywords, etc. that can be used to determine intents can also be used to determine human skill IDs related to the inputs from the user. Therefore, in some examples, the input from the user can be classified by the intent, which can be tagged or sorted by human skill IDs for automatically or otherwise seamlessly identifying the live agent best suited to assist the user. The inputs comprehendible by the virtual assistant 110 can enable the virtual assistant 110 to connect the user to the live agent 222 most closely related to the issue or other suitable client matter for which the user contacted the virtual assistant 110.

Additionally or alternatively, the process 300 can involve executing a machine learning model to determine the live agent 222. In some examples, the machine learning model is used to determine the live agent 222 by extracting, from the input 106, the entities. The machine learning model can further predict, based on the entities, the intent related to the input 106 and the machine learning model can determine, based on the intent, the live agent 222. For example, the input 106 from the user can be processed into an input in which the virtual assistant 110 recognizes the entities "lend", "borrow", and "house. The entities can indicate to the virtual assistant 110 that the intent is mortgage related. Thus, the virtual assistant 110 can connect the user to a live agent that can be a mortgage consultant. The virtual assistant 110 can further determining an amount of time for connecting the live agent 222 and the user and can provide the amount of time to the user via the multi-modal user interface 100.

Additionally or alternatively, the process 300 can involve determining an amount of time for connecting the live agent 222 and the user. The amount of time can be determined by accessing a schedule or by accessing additional resources or data related to the availability of the live agent 222. In some examples, a machine learning system can be implemented to predict the amount of time before the live agent 222 will be available. The amount of time can be estimated based on the schedule or additional resources or data. The amount of time can be compared to a threshold time. For example, the threshold time can be one hour. If the amount of time for connecting the live agent 222 and the user is longer than the threshold time, the virtual assistant 110 can provide various courses of action for the user. For example, the courses of action can include providing access to the multi-modal user interface on an additional user device. For example, the user can switch from accessing the multi-modal user interface on a laptop to accessing the multi-modal user interface on a phone or a tablet to improve the convenience and accessibility of connecting the user and the live agent 222. Another example of a course of action can include providing a notification to the user device or the additional user device. The notification can cause the device to make noise, vibrate, or otherwise alert the user that the live agent 222 is ready to connect. Additionally, the courses of action can include the user providing an alternative communication method such as a phone number, email address, or the like. The virtual assistant 110 can provide the alternative communication method to the live agent 222 for the live agent 222 and the user to connect via the alternative communication method. Additionally, a timer can be displayed on the multi-modal user interface with the time such that the user can visualize the amount of time before the user will be connected to the live agent 222. The timer can be displayed in a chat window or separate from the chat window.

Additionally or alternatively, the process 300 can involve providing, via the virtual assistant 110, a response to the input 106. The response can include a response 114 requesting additional information. For example, the virtual assistant 110 may require additional details or information to connect the user to an applicable live agent 222. In some examples, the response 114 can include a statement to provide information to the user. The statement can include the amount of time before the user will be connected to the live agent 222, the name or job title of the live agent 222, or other pertinent information related to the input 106, live agent 222, etc. The statement can further notify the user that the user can leave the application or website without losing the chat window or chat history.

At block 310, the process 300 can involve connecting, via the virtual assistant 110, the user and the live agent 222. The user and live agent 222 can be connected via the chat window 102, phone call, email, video call, or other suitable communication methods. In some examples, the multi-modal user interface 100 can include the an option for the user to choose a preferred communication method. The virtual assistant 110 can facilitate the connection and improve the efficiency of communication between the live agent 222 and the user by providing both the user and the live agent 222 information. For example, the virtual assistant can provide the user information about the live agent 222, the amount of time before the user will connect with the live agent 222, etc. Additionally, the virtual assistant can provide the live agent 222 with information received from the inputs from the user and any additional information on the user that may be stored and accessible by the virtual assistant.

Additionally or alternatively, process 300 can involve storing the interaction between the user and the virtual assistant 110 and can involve detecting the user interacting with the multi-modal user interface or detecting the user is not interacting with the multi-modal user interface. The user interacting with the multi-modal user interface can be determined by tracking user activity on the multi-modal user interface. In an example, a lack of user activity for a certain time period can indicate that the user is not interacting with the system. Additionally, a notification can be provided to the user as a display on the multi-modal user interface or otherwise communicated to the user by the virtual assistant 110. If the user activity does not increase from the notification, it can be determined that the user is not viewing the multi-modal user interface. Therefore, a second notification can be provided to the user device. Additionally, the user can be provided access to the stored interaction between the user and the virtual assistant 110. Therefore, the user and the live agent can be connected when a user closes or otherwise leaves the multi-modal user interface without losing the history and data from the interaction between the virtual assistant 110 and the user.

Thus, the process 300 can improve the efficiency of connecting the user to the live agent 222 by performing natural language processing, natural language understanding, or a combination thereof to decrease the number interactions between the virtual assistant 110 and the user prior to connecting the user and live agent 222. The process 300 further improves the efficiency of determining which live agent 222 is best suited to assist the user with the input 106 based on the result of the natural language process, natural language understanding, or combination thereof. Moreover, the process 300 can improve the user's experience by not requiring the user to spend additional time communicating with the virtual assistant 110 and the user may not have to wait in a chat window 102, phone call, or other communication method prior to connecting with the live agent 122. The multi-modal user interface 100 further allows the user to interact with the virtual assistant 110 by various modes of communication, which can improve the accuracy and efficiency of communication between the user and the virtual assistant 110. The multi-modal user interface 100 can further enable the user to interact with the live agent 222 in a variety of formats.

Figure 4:
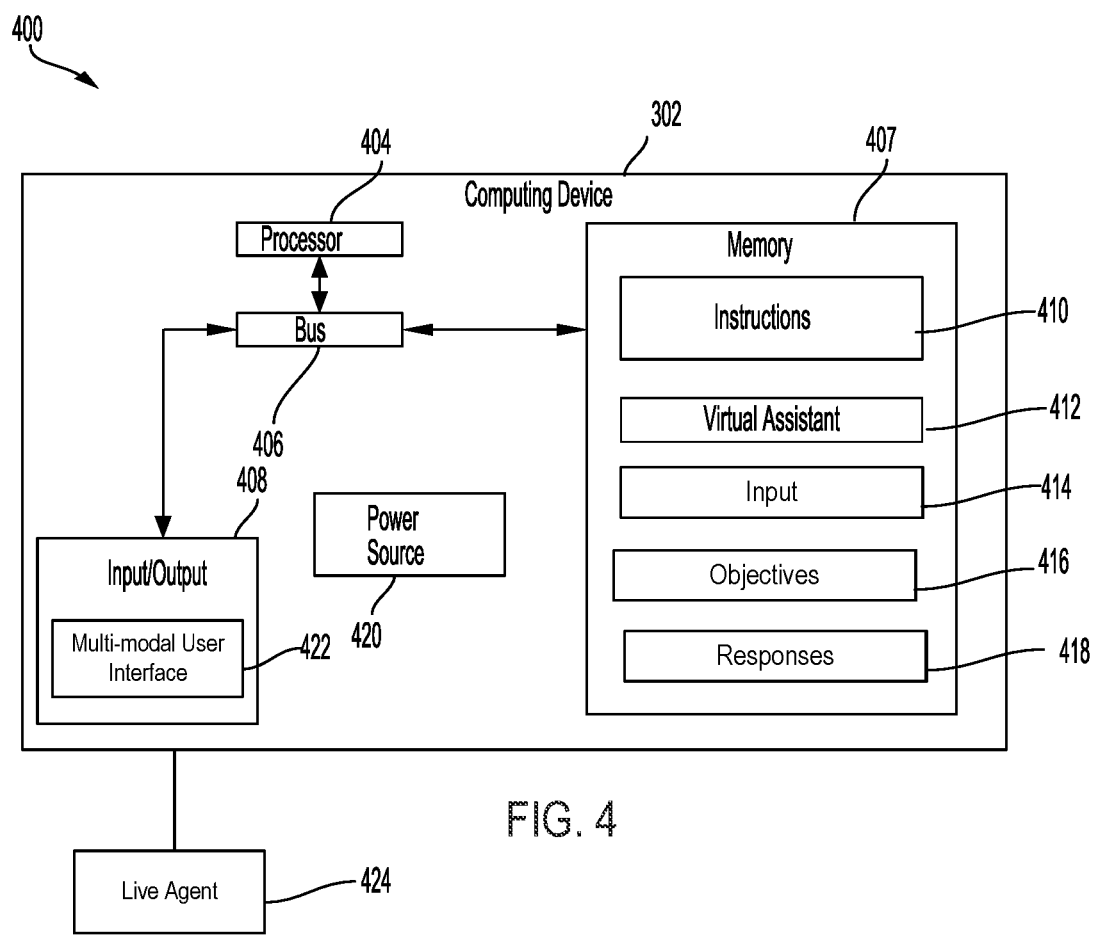
FIG. 4 is a block diagram of an example of a computing device for connecting a user to a live agent via a virtual assistant according to one example of the present disclosure.

FIG. 4 is a block diagram of an example of a computing device 402 for connecting a user to a live agent via a virtual assistant 412 according to one example of the present disclosure. The components shown in FIG. 3, such as a processor 404, a memory 407, a power source 420, an input/output 408, and the like may be integrated into a single structure such as within a single housing of the computing device 402. Alternatively, the components shown in FIG. 4 can be distributed from one another and in electrical communication with each other.

The computing device 402 can include the processor 404, the memory 407, and a bus 406. The processor 404 can execute one or more operations for controlling the hydraulic fracturing operation using one or more optimization models subject to one or more constraints. The processor 404 can execute instructions 410 stored in the memory 407 to perform the operations. The processor 404 can include one processing device or multiple processing devices or cores. Non-limiting examples of the processor 404 include a Field-Programmable Gate Array ("FPGA"), an application-specific integrated circuit ("ASIC"), a microprocessor, etc.

The processor 404 can be communicatively coupled to the memory 307 via the bus 406. Non-volatile memory may include any type of memory device that retains stored information when powered off. Non-limiting examples of the memory 407 may include EEPROM, flash memory, or any other type of non-volatile memory. In some examples, at least part of the memory 407 can include a medium from which the processor 404 can read instructions 410. A computer-readable medium can include electronic, optical, magnetic, or other storage devices capable of providing the processor 404 with computer-readable instructions or other program code. Nonlimiting examples of a computer-readable medium include (but are not limited to) magnetic disk(s), memory chip(s), ROM, RAM, an ASIC, a configured processor, optical storage, or any other medium from which a computer processor can read instructions 410. The instructions 410 can include processor-specific instructions generated by a compiler or an interpreter from code written in any suitable computer-programming language, including, for example, C, C++, C#, Perl, Java, Python, etc.

In some examples, the memory 407 can be a non-transitory computer readable medium and can include computer program instructions 410. For example, the computer program instructions 410 can be executed by the processor 404 for causing the processor 404 to perform various operations. For example, the processor 404 can provide a virtual assistant 412 that can receive inputs 414 from a user and provide responses 418 to the user. The processor 404 can further perform natural language processing, natural language understanding, or a combination thereof on the inputs 414 to generate inputs that can be understood by the virtual assistant 412. Additionally, the processor 404 can determine the live agent based on objectives 416 that can be predicted based on the inputs 414. The processor 404 can also connect the user and the live agent device 424 via the multi-modal user interface 422 or other suitable communication method.

The computing device 402 can additionally include an input/output 408. The input/output 408 can connect to a keyboard, a pointing device, a display, other computer input/output devices or any combination thereof. A user may provide input using a multi-modal user interface 422 that can be part of or communicatively coupled to input/out 408. The virtual assistant 412, a chat window, the inputs 414, the response 418, or a combination thereof can be displayed to the user, the live agent, or other suitable user a display, such as the multi-modal user interface 422, that is connected to or is part of the input/output 408. The input/output can further connect to a live agent device 424 to connect the user and the live agent via the input/output 408 or the multi-modal user interface 422. Alternatively, the computing device 402 can, instead of displaying the interaction between the virtual assistant 412 and the user can automatically connect the live agent device 424 and the user via a phone call or other suitable communication method.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory device that includes instructions executable by the processing device for causing the processing device to perform operations comprising:
   providing a virtual assistant that receives inputs from a user and provides responses to the user, wherein an interaction between the virtual assistant and the user is displayed in a chat window on a multi-modal user interface, the multi-modal user interface usable on a user device, and the multi-modal user interface enabling the virtual assistant to receive inputs by a plurality of modes of communication;
   performing natural language processing on the inputs to process the inputs into inputs that are comprehendible by the virtual assistant;
   predicting, based on the inputs, at least one objective of the user, wherein the at least one objective includes a first objective for communication with a live agent and a second objective for a purpose for the communication with the live agent;

determining the live agent that is best suited to assist the user based on the second objective;

determining an amount of time for connecting the live agent and the user by:
    accessing a schedule for the live agent;
    estimating, based on the schedule, the amount of time;
    comparing the amount of time to a threshold time, wherein an amount of time longer than the threshold time causes the virtual assistant to provide courses of action to the user, the courses of action including:
        providing access to the multi-modal user interface on a second user device;
        providing a notification on the user device by causing the user device to vibrate after the amount of time;
        providing a notification on the second user device by causing the second user device to vibrate after the amount of time; and
        receiving, from the user, an alternate communication method and the virtual assistant communicating the alternate communication method to the live agent; and
    displaying, via the multi-modal user interface, a timer for tracking the amount of time, wherein the timer is displayed on the multi-modal user interface separate from the chat window; and
connecting the user and the live agent, wherein the virtual assistant facilitates the connection of the user and the live agent by providing information to the user and to the live agent.

2. The system of claim 1, further comprising storing the interaction between the user and the virtual assistant and detecting the user interacting with the multi-modal user interface or detecting the user is not interacting with the multi-modal user interface by:
    tracking user activity on the multi-modal user interface, wherein a lack of user activity for a certain time period indicates that the user is not interacting with the system;
    providing a first notification as a display on the multi-modal user interface;
    determining a second lack of user activity that indicates the user is not viewing the multi-modal user interface;
    providing a second notification to the user device; and
    providing user access to the stored interaction between the user and the virtual assistant.

3. The system of claim 1, wherein the operation of providing the virtual assistant that receives inputs from the user and provides the responses to the user further comprises:
    providing at least one option by displaying the at least one option on the multi-modal user interface;
    receiving, by the virtual assistant, an input corresponding to the at least one option; and
    connecting the user and the live agent automatically based on the at least one option.

4. The system of claim 1, wherein the plurality of modes of communication include text, speech, and touch, wherein the virtual assistant receives inputs in at least two of the plurality of modes of communication substantially simultaneously, and wherein the natural language processing is performed on inputs received in at least two of the plurality of modes of communication substantially simultaneously.

5. The system of claim 1, wherein the operation of determining the live agent best suited to assist the user further comprises executing a machine learning model, the machine learning model determining the live agent by:
    extracting entities from the inputs;
    predicting, based on the entities, the second objective related to the inputs; and
    predicting, based on second objected, the live agent best suited to assist the user.

6. The system of claim 1, wherein the operation of performing the natural language processing to process the inputs into inputs comprehendible by the virtual assistant further comprises performing utterance learning on the inputs, wherein utterance learning is performed on inputs received by speech and inputs received by text substantially simultaneously.

7. A computer-implemented method comprising:
    providing a virtual assistant that receives inputs from a user and provides responses to the user, wherein an interaction between the virtual assistant and the user is displayed in a chat window on a multi-modal user interface, the multi-modal user interface usable on a user device, and the multi-modal user interface enabling the virtual assistant to receive inputs by a plurality of modes of communication;
    performing natural language processing on the inputs to process the inputs into inputs that are comprehendible by the virtual assistant;
    predicting, based on the inputs, at least one objective of the user, wherein the at least one objective includes a first objective for communication with a live agent and a second objective for a purpose for the communication with the live agent;
    determining the live agent that is best suited to assist the user based on the second objective;
    determining an amount of time for connecting the live agent and the user by:
        accessing a schedule for the live agent;
        estimating, based on the schedule, the amount of time;
        comparing the amount of time to a threshold time, wherein an amount of time longer than the threshold time causes the virtual assistant to provide courses of action to the user, the courses of action including:
            providing access to the multi-modal user interface on a second user device;
            providing a notification on the user device by causing the user device to vibrate after the amount of time:
            providing a notification on the second user device by causing the second user device to vibrate after the amount of time; and
            receiving, from the user, an alternate communication method and the virtual assistant communicating the alternate communication method to the live agent; and
        displaying, via the multi-modal user interface, a timer for tracking the amount of time, wherein the timer is displayed on the multi-modal user interface separate from the chat window; and
    connecting the user and the live agent, wherein the virtual assistant facilitates the connection of the user and the live agent by providing information to the user and to the live agent.

8. The computer-implemented method of claim 7, further comprising storing the interaction between the user and the virtual assistant and detecting the user interacting with the multi-modal user interface or detecting the user is not interacting with the multi-modal user interface by:
    tracking user activity on the multi-modal user interface, wherein a lack of user activity for a certain time period indicates that the user is not interacting with the multi-modal user interface;
    providing a first notification as a display on the multi-modal user interface;
    determining a second lack of user activity that indicates the user is not viewing the multi-modal user interface;
    providing a second notification to the user device; and
providing user access to the stored interaction between the user and the virtual assistant.

9. The computer-implemented method of claim 7, wherein providing the virtual assistant that receives inputs from the user and provides the responses to the user further comprises:
    providing at least one option by displaying the at least one option on the multi-modal user interface;
    receiving, by the virtual assistant, an input corresponding to the at least one option; and
    connecting the user and the live agent automatically based on the at least one option.

10. The computer-implemented method of claim 7, wherein the plurality of modes of communication include text, speech, and touch, wherein the virtual assistant receives inputs in at least two of the plurality of modes of communication substantially simultaneously, and wherein the natural language processing is performed on inputs received in at least two of the plurality of modes of communication substantially simultaneously.

11. The computer-implemented method of claim 7, wherein determining the live agent best suited to assist the user further comprises executing a machine learning model, the machine learning model determining the live agent by:
    extracting entities from the inputs;
    predicting, based on the entities, the second objective related to the inputs; and
    predicting, based on second objected, the live agent best suited to assist the user.

12. The computer-implemented method of claim 7, wherein performing the natural language processing to process the inputs into inputs comprehendible by the virtual assistant further comprises performing utterance learning on the inputs, wherein utterance learning is applied to inputs received by speech and inputs received by text.

13. A non-transitory computer-readable medium comprising instructions that are executable by a processing device for causing the processing device to perform operations comprising:
    providing a virtual assistant that receives inputs from a user and provides responses to the user, wherein an interaction between the virtual assistant and the user is displayed in a chat window on a multi-modal user interface, the multi-modal user interface usable on a user device, and the multi-modal user interface enabling the virtual assistant to receive inputs by a plurality of modes of communication;
    performing natural language processing on the inputs to process the inputs into inputs that are comprehendible by the virtual assistant;
    predicting, based on the inputs, at least one objective of the user, wherein the at least one objective includes a first objective for communication with a live agent and a second objective for a purpose for the communication with the live agent;
    determining the live agent that is best suited to assist the user based on the second objective;
    determining an amount of time for connecting the live agent and the user by:
    accessing a schedule for the live agent;
    estimating, based on the schedule, the amount of time;
    comparing the amount of time to a threshold time, wherein an amount of time longer than the threshold time causes the virtual assistant to provide courses of action to the user, the courses of action including:
    providing access to the multi-modal user interface on a second user device:
    providing a notification on the user device by causing the user device to vibrate after the amount of time;
    providing a notification on the second user device by causing the second user device to vibrate after the amount of time; and
    receiving, from the user, an alternate communication method and the virtual assistant communicating the alternate communication method to the live agent; and
    displaying, via the multi-modal user interface, a timer for tracking the amount of time, wherein the timer is displayed on the multi-modal user interface separate from the chat window; and
    connecting the user and the live agent, wherein the virtual assistant facilitates the connection of the user and the live agent by providing information to the user and to the live agent.

14. The non-transitory computer-readable medium of claim 13, further comprising storing the interaction between the user and the virtual assistant and detecting the user interacting with the multi-modal user interface or detecting the user is not interacting with the multi-modal user interface by:
    tracking user activity on the multi-modal user interface, wherein a lack of user activity for a certain time period indicates that the user is not interacting with the multi-modal user interface;
    providing a first notification as a display on the multi-modal user interface;
    determining a second lack of user activity that indicates the user is not viewing the multi-modal user interface;
    providing a second notification to the user device; and
    providing user access to the stored interaction between the user and the virtual assistant.

15. The non-transitory computer-readable medium of claim 13, wherein the operation of providing the virtual assistant that receives inputs from the user and provides the responses to the user further comprises:
    providing at least one option by displaying the at least one option on the multi-modal user interface;
    receiving, by the virtual assistant, an input corresponding to the at least one option; and
    connecting the user and the live agent automatically based on the at least one option.

16. The non-transitory computer-readable medium of claim 13, wherein the plurality of modes of communication include text, speech, and touch, wherein the virtual assistant receives inputs in at least two of the plurality of modes of communication substantially simultaneously, and wherein the natural language processing is performed on inputs received in at least two of the plurality of modes of communication substantially simultaneously.

17. The non-transitory computer-readable medium of claim 13, wherein the operation of determining the live agent best suited to assist the user further comprises executing a machine learning model, the machine learning model determining the live agent by:
- extracting entities from the inputs;
- predicting, based on the entities, the second objective related to the inputs; and
- predicting, based on second objected, the live agent best suited to assist the user.

\* \* \* \* \*